E. E. COVEYOU.
HONEY UNCAPPING MACHINE.
APPLICATION FILED JUNE 12, 1920.

1,378,371.

Patented May 17, 1921.
2 SHEETS—SHEET 1.

Elias E. Coveyou, INVENTOR

BY L. B. James, ATTORNEY

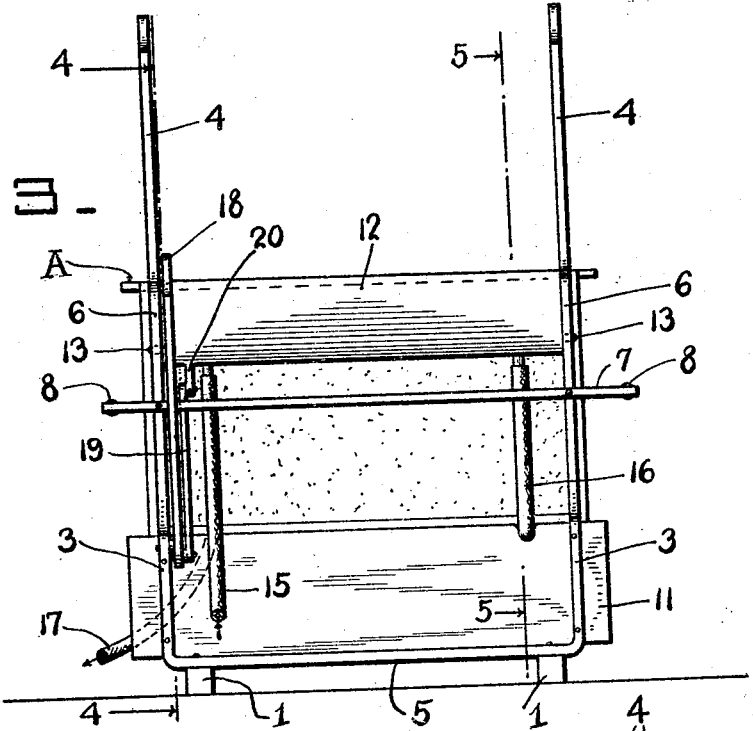
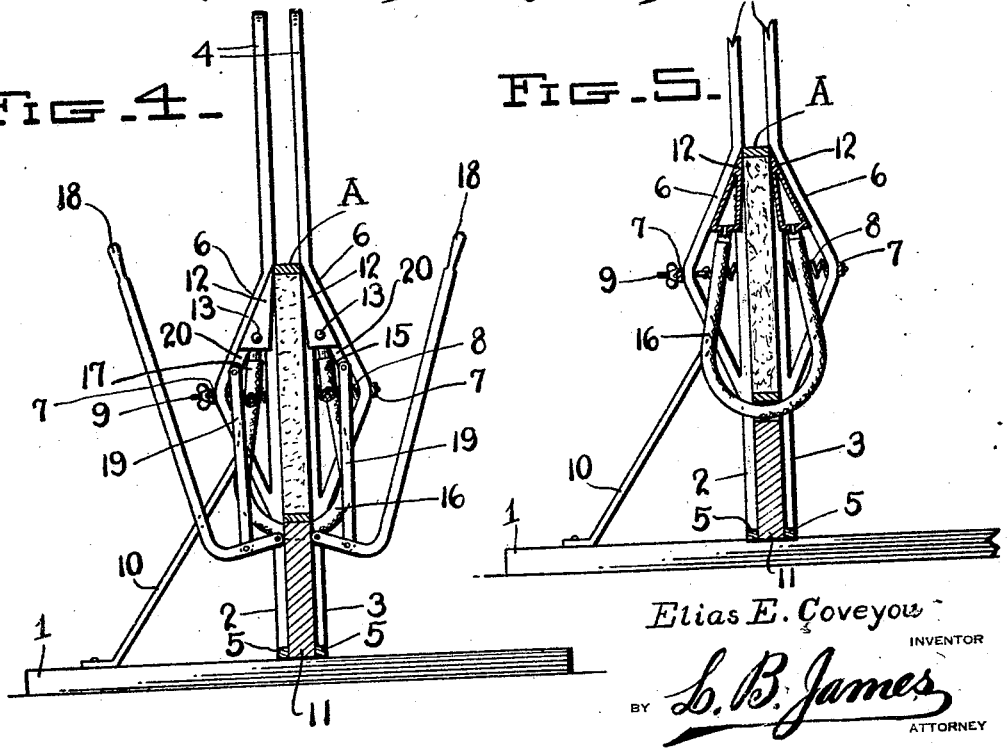

UNITED STATES PATENT OFFICE.

ELIAS E. COVEYOU, OF PETOSKEY, MICHIGAN.

HONEY-UNCAPPING MACHINE.

1,378,371.  Specification of Letters Patent.  Patented May 17, 1921.

Application filed June 12, 1920. Serial No. 388,529.

*To all whom it may concern:*

Be it known that I, ELIAS E. COVEYOU, a citizen of the United States, residing at Petoskey, in the county of Emmet and State of Michigan, have invented certain new and useful Improvements in Honey-Uncapping Machines, of which the following is a specification.

This invention relates to a machine for uncapping honey and the principal object of the invention resides in means, including steam heated knives, for uncapping both sides of the comb simultaneously.

Another object of the invention is to provide means whereby the device will accommodate itself to combs of different thicknesses.

Still another object of the invention is to provide means whereby the knives may be adjusted to uncap the comb where the bottom and top bars of the frame project beyond the honey or where the honey comb is thinner than the frame.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Fig. 3 is a front view thereof;

Fig. 4 is a vertical sectional view on line 4—4 of Fig. 3;

Fig. 5 is a similar view on line 5—5 of Fig. 3;

Figure 1:
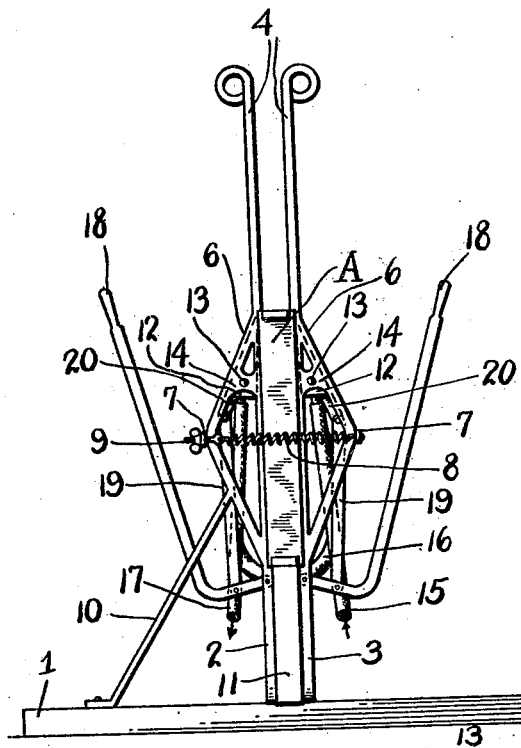
Figure 1 is a side view of the uncapping machine.
Figure 6:
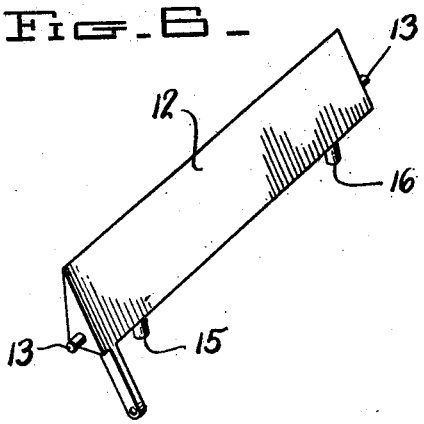
Fig. 6 is a detail perspective view of one of the cutting knives.
Figure 2:
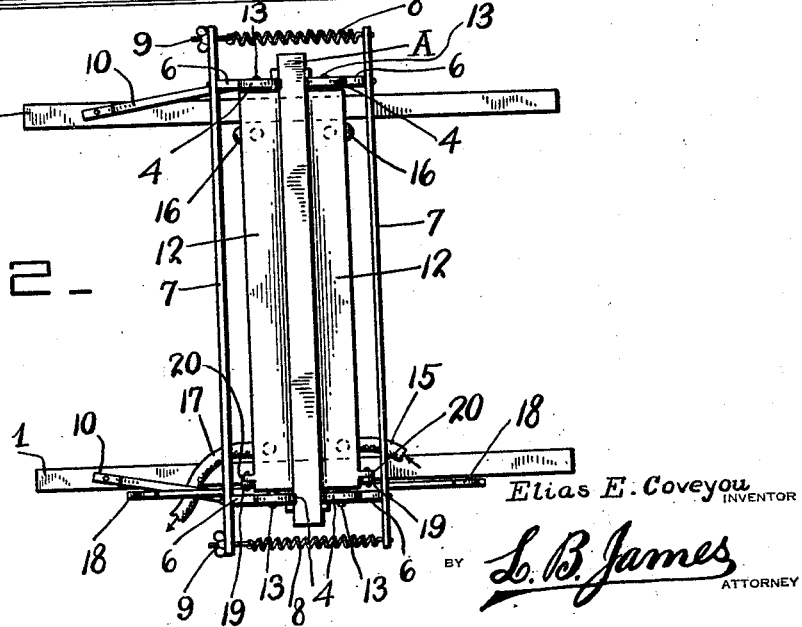
Fig. 2 is a plan view thereof.

In these views, 1 indicates a base on which the machine is supported, and 2 indicates the stationary part of the framework, while 3 indicates the movable part. Each part comprises a pair of spaced uprights 4, connected together at their lower ends by the cross piece 5, and the truss pieces 6, connected with the uprights intermediate their ends. The truss pieces 6 on each pair of uprights are connected together by the cross bar 7, the ends of the cross bars extending beyond the uprights and the ends of the cross bar of the movable part of the framework is connected with the ends of the cross bar of the stationary part by the springs 8. The tension of these springs may be adjusted by means of the screw bolts 9 which are carried by the cross bar of the stationary frame and have eyes to receive the springs. The stationary part is connected with the base by the braces 10. It will thus be seen that the springs 8 will tend to draw the movable frame toward the stationary frame but this inward movement is limited by the strip 11, placed between the two frames at their lower portions. This strip must be of less thickness than the comb to be uncapped.

A knife 12 is carried by each frame, said knives being pivotally mounted in the frames by the pivot pins 13 at the ends of the knives, engaging openings formed in the webs 14 which connect the upper parts of the truss bars or pieces 6 with the uprights. The knives are of substantially triangular shape in cross section and are made hollow to provide steam chambers. The pivot pins are located adjacent the base part of the knives. Steam is supplied to the knife of the movable frame by the tube 15 and it is carried from this knife to the other knife by the tube 16 and the steam exhausts from the last mentioned knife through the tube 17. As shown, the tube 16 is looped, the bottom of the loop resting in a slot in the strip 11.

The means for tilting the knives, in order to adjust them relatively to the comb, consists of an L shaped lever 18 pivotally connected with each of the movable and stationary frames and connected by the link 19 with the arm 20 which is connected with the base of each knife. By actuating these levers, the knives will be rocked on their pivot pins so as to place their cutting edges in proper position relative to the comb. This will permit the knives to uncap combs which are of less thickness than the honey frames.

The uprights are provided with loops at their upper ends which act as handles for drawing them apart in order to insert the frame, indicated at A, between them.

After the knives are sufficiently heated, a frame of honey is placed between the uprights and slid downwardly until its lower edge contacts with the knives. The knives are then adjusted to bring their cutting edges into proper position to uncap the honey and then the frame is forced the rest of the way downwardly between the uprights, thus bringing the entire face of each side of the honey comb against the knife and uncapping all the cells.

As will be well understood, the hot knives will slice off the ends of the cells without breaking the wax and thus avoid mixing particles of wax with the honey.

It is thought from the foregoing description that the advantages and novel features of my invention will be readily apparent.

I desire it to be understood that I may make changes in the construction and in the combination and arrangement of the several parts provided that such changes fall within the scope of the appended claim.

What I claim is new is:—

A machine of the class described comprising a guiding frame comprising a stationary part and a movable part, springs for drawing the movable part toward the stationary part, a knife adjustably mounted in each part, manual means for adjusting the knives and means for passing steam through the knives.

In testimony whereof I affix my signature.

ELIAS E. COVEYOU.